United States Patent [19]

Wildmann

[11] Patent Number: 4,899,343

[45] Date of Patent: Feb. 6, 1990

[54] LASER LAYOUT

[75] Inventor: Daniel Wildmann, Dielsdorf, Switzerland

[73] Assignee: Ciba-Geigy AG, Basel, Switzerland

[21] Appl. No.: 293,337

[22] Filed: Jan. 5, 1989

[30] Foreign Application Priority Data

Jan. 20, 1988 [CH] Switzerland ............................ 183/88

[51] Int. Cl.[4] ................................................. H01S 3/10
[52] U.S. Cl. .......................................... 372/9; 372/38
[58] Field of Search .......................... 372/9, 38, 94, 70

[56] References Cited

U.S. PATENT DOCUMENTS 4,181,899  1/1980  Liu .
4,398,294  8/1983  Miller et al. ........................... 372/70
4,494,873  1/1985  Perlmutter et al. .................... 372/94
4,544,839  10/1985 Weil et al. .
4,617,666  10/1986 Liu .

Primary Examiner—Léon Scott, Jr.
Attorney, Agent, or Firm—Burns, Doane, Swecker & Mathis

[57] ABSTRACT

In a laser layout, a rapid photodiode is coordinated with a fully reflecting mirror of a laser, the output signal of which is compared in a comparator with a reference voltage that may be set on a potentiometer, so that if the power density detected in the resonator of the laser by a photodiode exceeds the reference voltage, the laser is deactivated to protect a frequency doubling crystal by actuating a Q-switch and/or a shutter.

20 Claims, 1 Drawing Sheet

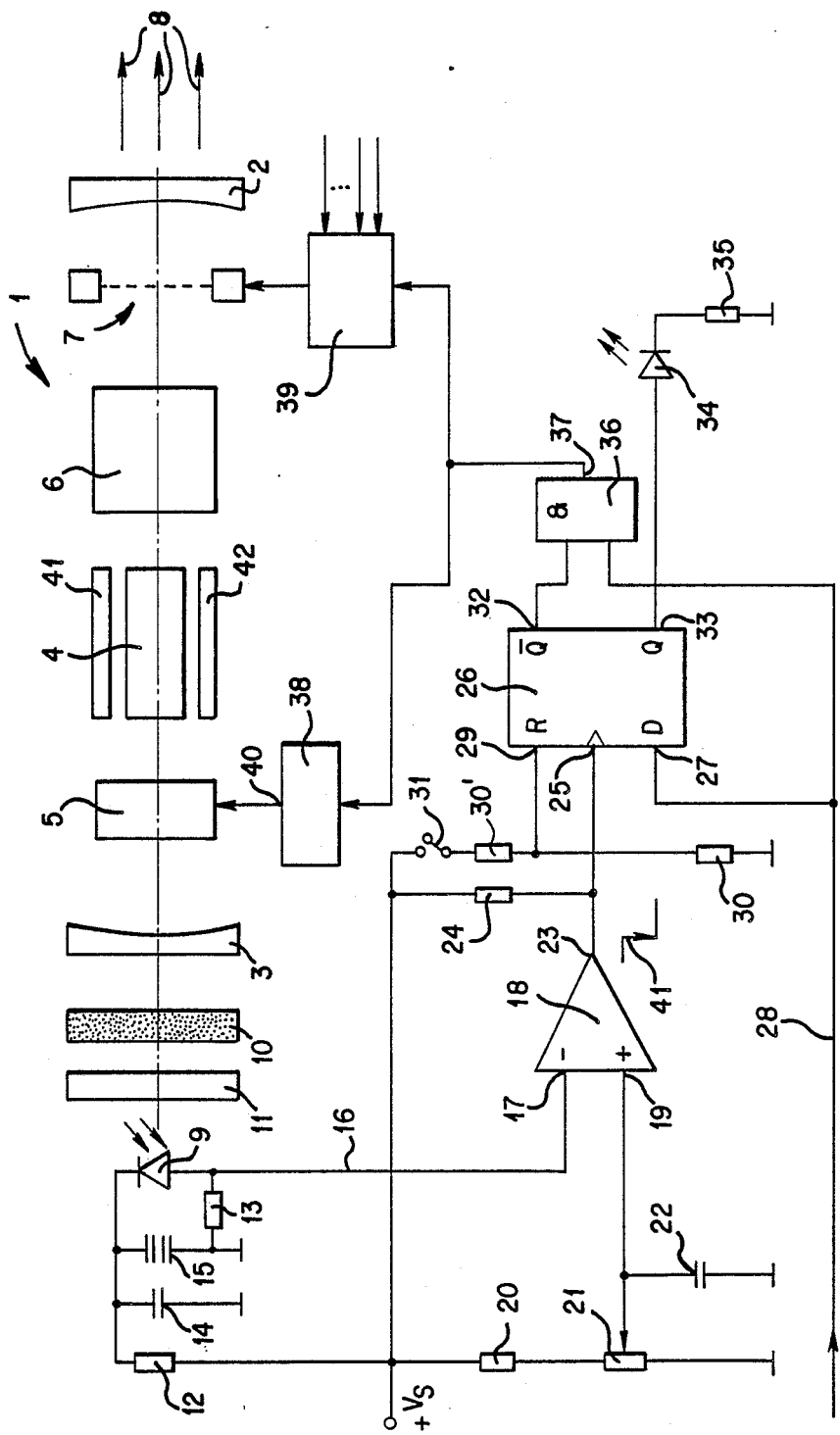

LASER LAYOUT

BACKGROUND OF THE INVENTION

The invention relates to a laser layout with an optical resonator cavity bounded by a fully reflecting mirror and a partially reflecting mirror, in which an active laser medium and a crystal for the generation of second and higher harmonics are located.

A laser layout of this type with a Q switch to control the pulsed operation of the laser is known for example from U.S. Pat. No. 4,617,666 and contains a so-called intracavity-SHG-crystal for the doubling of frequency on the basis of the effect exhibited by many crystals of producing a second harmonic (second harmonic generation). The doubling of the light frequency in lasers is a relatively simple process to enlarge the spectrum of the frequencies available. This takes place in particular in the case of lasers, the capacities of which are within the range of 80 and 100 Watts, and which are used for example for the engraving of plastic or metal surfaces. It is frequently desirable here to obtain high output capacities, with power densities in the resonator approaching the destruction threshold of the SHG crystals on their antireflection coatings. This, however, easily leads to the destruction of the expensive SHG crystals, if lasers in industrial use cannot be maintained by competent personnel, and rough environmental conditions, in particular thermal variations in the laser configuration, alter the setting of the components of the laser, so that excessive power densities occur in the resonator, which overload the SHG crystal.

In U.S. Pat. No. 4,181,899 a laser for the generation of second harmonics in crystal is described, the fundamental wavelength of which amounts to 1.06 $\mu$m. The generation of harmonics is limited by the heating of the crystal by thermo-optical effects, which leads to erroneous phase matching and which reduces the conversion efficiency. This limitation is overcome in the known laser by the tuning of the laser wavelength, thereby obtaining an improved conversion efficiency of the generation of the harmonics. The tuning is effected by determining the crystal temperature of the known laser equipped with a Q switch. By means of a dielectric polarizer, part of the frequency-doubled outlet light is intercepted at a wavelength of 0.53 $\mu$m on a light detector, which makes it possible to detect the intensity of the frequency-doubled output light, in order to tune by means of a variable operating voltage, a tuning element.

A laser oscillator with an output modulator according to Swiss patent publication No. 544,426 comprises a photodetector, which detects the light exiting from the resonator with a transmission of 0.1% of the resonator, the capacity of which is proportional to the optical power density in the laser resonator. The optical resonator has as a modulatable output mirror a tunable interferometer. The known layout measures the power of the laser light by means of a photodetector during the tuning of the interferometer, wherein the proportional electrical signal may be passed to a peak value detector and a comparator.

A laser beam monitoring system according to U.S. Pat. No. 4,544,839 contains a transparent zinc selenide disk provided in the external beam path of the laser, which permits the passage of about 75% of the energy of the laser beam of a $CO_2$ laser. The partial beam intercepted at an inclination of 83° impacts through a focusing lens a photosensitive sensor. The sensor is connected with an amplifier, the outlet of which controls a shutter diaphragm of the laser.

From French patent publication No. 2,171,866 a process and an apparatus are known for the stabilization of the energy of a laser beam, which also make it possible to interrupt the emission of the laser beam, if it exceeds a predetermined intensity. The known apparatus comprises an intercepting mirror for part of the laser light output which impacts a photoelectric cell and actuates, by means of a comparator, a power amplifier to which a pumping light source is connected. By comparing the electrical signal with a reference signal, it is possible to interrupt the operation of the pumping light source if a predetermined power is exceeded.

SUMMARY OF THE INVENTION

It is the object of the invention to provide a laser layout of the aforementioned type, whereby the power density in a resonator is detected simply and reliably and the frequency doubling crystal is protected against dangerous power densities in the resonator.

This object is attained according to the invention by providing a power sensor layout outside the resonator chamber, aligned approximately with the longitudinal axis of the resonator, in the vicinity or near the fully reflecting mirror. The sensor layout comprises a scatter disk, a filter for absorbing the frequency doubled wavelength of the laser medium and the wavelength of the pumping light, and an optical sensor connected with a comparator circuit, whereby a device to deactivate the laser is actuated.

The optical sensor preferably consists of a rapid photodiode, and the device to deactivate the laser contains a Q-switch and/or a shutter to shut down the laser by degrading the quality of the resonator. The output of the comparator circuit is connected with a monoflop or a flip-flop circuit, which flips if the power density is exceeded and insures that the laser layout remains inactive until the actuation of a reset switch.

The provision of a scatter disk eliminates the need for accuracy adjustments or readjustments of the beam path for the light sensor. The filter prevents the pump light, for example the lamp light of a Nd:YAG laser, or the frequency doubled light from the resonator chamber, from having access to the light sensor. This leads to a signal noise ratio which is good enough, so that the light energy of the fundamental wavelength passed by the fully reflecting mirror is sufficient to obtain a signal which can be evaluated, despite the higher light energy exiting at the mirror with a half wavelength and with the wavelength spectrum of the pump light.

BRIEF DESCRIPTION OF THE DRAWINGS

Other objects and advantages of the present invention will become more apparent from the following detailed description of the preferred embodiments, as described in conjunction with the accompanying drawing wherein:

The single figure schematically shows the configuration of the laser layout according to the invention.

DETAILED DESCRIPTION OF THE PREFERRED EMBODIMENTS

The laser layout comprises a laser 1 with an optical resonator, which on the one hand is bounded by an intercepting mirror 2 that fully reflects the fundamental wavelength of the laser 1 and that is permeable for the frequency doubled radiation, and on the other hand, by a full reflector 3, which almost completely reflects the fundamental wavelength, while it is essentially transparent for the frequency doubled radiation. In the resonator chamber, an active medium 4 is located with the associated lamps 41 and 42, consisting in the usual manner of Nd:YAG lasers. Also, in a known manner, a Q-switch or quality switch 5 is provided, which makes it possible to control a pulsating operation of the laser 1 with a repetition frequency of between about 1 kHz and 30 kHz. The activation of the Q-switch causes optical losses, which may be large enough to interrupt the oscillations of the laser 1. If the lamps 41 and 42 provided to generate the pump light remain inactive during the low quality period, energy is stored in the active medium 4 because of an inversion of the occupation numbers of the energy levels. Upon the deactivation of the Q-switch 5, i.e. upon the return to its high quality state, a transition from an upper to a lower energy level takes place with the emission of a very intensive light pulse, with a wavelength of, for example, 1.06 μm.

As seen in the drawing, a frequency doubling crystal 6 of an SHG crystal is provided on the side of the active medium opposite the Q-switch, the frequency doubling crystal 6 producing the light with a wavelength of 532 nm, if by appropriate settings the condition of the necessary phase matching is satisfied. If the frequency doubling crystal 6 is adjusted poorly, a low conversion efficiency and thus a smaller absorption, is obtained, which leads to an undesirable increase in the power density in the resonator.

If the frequency doubling crystal 6 has been displaced from its adjusted position, for example by thermal effects or a mechanical shock effect, this leads to a sudden increase in the power density in the resonator, which is to be voided by means of the safety circuit to be discussed hereinbelow, said circuit controlling both the Q-switch 5 and a shutter 7 (intracavity shutter).

It would be apparent to those skilled in the art that the safety circuit described below may be used not only for the pulsed laser 1 described as the exemplary embodiment, but also for continuous lasers, as the power density in the resonator of the laser 1 is detected as a function of time and the laser 1 may be deactivated if a certain adjustable power threshold is exceeded even for a short period of time.

In addition to the frequency doubled light intercepted by the intercepting mirror 2 and indicated in the drawing by three arrows 8, in the case of the laser 1 a transmission of frequency doubled light also takes place at the full reflector 3, together with a certain residual transmission of the light with the fundamental wavelength, the intensity of which suffices to provide a measure of the power density of the fundamental wavelength inside the laser 1.

The evaluation of the residual transmission at the full reflector 3 is carried out in a manner such that a rapid photodiode 9 is exposed to the light exiting at the full reflector 3. In order to be independent of critical adjustments and the migration of the illuminated surface on the full reflector 3, a scatter disk 10 which scatters the light exiting from the full reflector as homogeneously as possible over a large scatter angle, is coordinated with the photodiode 9 and the full reflector 3, which only theoretically reflects 100% of the light. The scatter disk 10 is a coated scatter disk (Marata disk), in which an optically clear or slightly cloudy support is coated with a thin, clouded layer with volume scattering. In order to detect the power density inside the laser 1 for the fundamental wavelength (1.06 μm) independently of the frequency doubled wavelength (532 nm), an infrared filter 11 is provided between the photodiode 9 and the scatter disk 10 which, as far as possible, is permeable for larger fundamental wavelengths only and is impermeable for the half wavelength and the pumping light. The infrared filter 11 thus prevents the incidence of the pumping light emitted by the lamps 41 and 42 onto the photodiode 9.

Depending on the intensity of the light impacting the photodiode 9, a measuring current is flowing through the photodiode 9, which is a measure of the power density detected by the intensity of the light with the fundamental wavelength inside the laser 1 and which is evaluated by the protective circuit described below.

The cathode of the photodiode 9 is connected through a protective resistor 12 with the positive pole $+V_S$ of the power source of the protective circuit. The anode of the photodiode 9 is connected through an operating resistor 13 with the circuit ground. As seen in the circuit diagram, the cathode of the photodiode 9 is further connected with the circuit ground by means of a filter capacitor 14 and a storage capacitor 15.

The voltage signal obtained at the operating resistor 13 arrives through a line 16 at the inverting inlet 17 of an operational amplifier connected as a comparator, the non-inverting inlet 19 of which is exposed to a variable reference voltage. The variable reference voltage is obtained by means of a voltage divider, consisting of a solid resistor 20 and a potentiometer 21, from the supply voltage of the protective circuit. For smoothing and disconnecting, the movable pick-off of the potentiometer 21 is grounded through a capacitor 22.

The outlet 23 of the comparator 18 is connected on the one hand through a load resistor 24 with a power source, and on the other hand, with the clock inlet 25 of a D-flip-flop.

The information inlet 27 of the D-flip-flop is connected with an operating control line 28, which carries control signals of a logic circuit, in particular for the actuation of the Q-switch 5.

The reset inlet 29 of the D-flip-flop 26 is connected with an intermediate pick-off of a voltage divider consisting of two fixed resistors 30 and 30' connected in series with a reset key 31, in order to produce a reset pulse from the power source of the protective circuit for the D-flip-flop by depressing the reset key 31. Upon resetting, the D-flip-flop 26 assumes a state in which the inverted outlet 32 is located at logic 1, while the non-inverting outlet 33 supplies the voltage associated with the logic level 0.

As seen in the drawing, the non-inverting outlet 33 is connected with a luminous diode 34, the cathode of which is grounded through a protective resistor 35. The luminous diode 34 indicates the internal state of the protective circuit and lights up if the laser 1 is deactivated because the permissible power density has been exceeded.

The signals standing at the inverted outlet 32 and the operating control line 28 supply the inlets of an AND gate 36, the outlet 37 of which is connected on the one hand with the inlet of a driver 38 for the pulsating operation of the Q-switch 5, and on the other hand, with the inlet of a safety system 39. The safety system 39 carries out an AND connection of a series of safety related signals, and closes the shutter 7 (intracavity shutter), if one of said signals is absent, so that the operation of the laser 1 becomes impossible. In view of the relatively low switching velocity of the shutter 7, the Q-switch 5 is permanently actuated, if the production of laser light is to be interrupted with a brief delay time, because the permissible power density has been exceeded. A logic 1 signal at the inlet of the driver 38 thus produces at the outlet 40 of the driver 38 a voltage whereby the Q-switch is periodically deactivated, so that laser pulses may be generated. If, however, the AND gate 36 is closed by means of the inverted outlet 32 of the D-flip-flop 26, a signal is standing at the outlet 40 of the driver 38, which leaves the Q-switch 5 permanently actuated, so that no laser pulses can be generated.

To set the reference voltage 19 of the comparator 18 on the potentiometer 21, the frequency doubling crystal 6 is temporarily removed from the resonator of the laser 1 and the intercepting mirror 2, which in the full reflector for the fundamental wavelength, is replaced by a mirror with 90% reflection at the fundamental wavelength. The laser 1 is operated with a low repetition frequency, with pulse lengths of, for example, between 100 and 300 nsec. As the peak power declines with rising repetition frequencies, it is possible to adjust the aforedescribed protective circuit in an operation with a low repetition frequency. For this, the maximum attainable voltage is measured at the load resistor 13 or the inverting inlet 17 of the comparator 18 and set as the reference voltage on the potentiometer 21. Instead of measuring the voltages involved directly, it is also possible to displace the potentiometer 21 in the direction of a higher reference voltage to a point just prior to the switching of the comparator 18 and the permanent actuation of the Q-switch 5. Such an adjustment insures that the power density in the laser 1 can never exceed the predetermined value compatible with the optical components in the resonator. The order of magnitude of the power density in the resonator may also be calculated if the transmission of the intercepting mirror 2 is known. The comparator 18 shuts down any time the power density in the resonator of the laser 1 becomes higher than the power density set with the reference voltage on the potentiometer 21. This signal is "frozen" into the protective circuit and may be used not only to close the slow shutter 7, but also to control the Q-switch 5 by means of a logic circuit, in order to insure the deactivation of the laser 1 within about 2 μsec.

Following the initialization of the protective circuit, the D-flip-flop 26 is in the reset state, wherein at its inverted outlet 32 a 1-signal is standing, so that signals arriving on the operating control line are conducted through the AND gate 36 to the driver 38 for the Q-switch 5 and the safety system 39. As a consequence of the pulsating operation of the laser 1, at the load resistor 13 voltage pulses correlated with the laser pulses are generated. When the adjusting process of the potentiometer 21 is completed and the frequency doubling crystal 6 is again in the necessary adjusting position inside the resonator chamber of the laser 1, the magnitude of the voltage pulses obtained at the load resistor 13 is lower than the variable reference voltage picked off at the potentiometer. For this reason, at the outlet 23 of the comparator 18, a high signal is always present. A high signal or a logic 1-signal also impacts the information inlet 27 of the D-flip-flop continuously during the predetermined pulsing operation time. The voltage standing at the outlet 33 is so small that the luminous diode 34 is not lighted.

If due to an interference the power density in the laser 1 attains a magnitude that is dangerous for the frequency doubling crystal 6, a voltage pulse appears at the load resistor 13, which is larger than the reference voltage at the non-inverting inlet 19 of the comparator 18, so that at the outlet 23 of the comparator 18 the trailing edge designated 41 is generated; it is conducted to the clock inlet 25 of the D-flip-flop, so that the latter assumes the logic state standing at the information inlet 27. For this reason, the D-flip-flop switches to the logic 1-state, so that at that the outlet 33 a voltage leading to the lighting of the luminous diode 34 appears, and at the inverted outlet 32 a logic 0-signal appears, whereby the AND gate is closed, together with the driver 38 of the Q-gate switch 5 and the safety system 39. The driver then maintains the Q-switch permanently actuated. The safety system 39 also closes the shutter 7 after a brief delay.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. Laser layout comprising:
   an optical resonator chamber bounded by a fully reflecting mirror and a partially reflecting mirror;
   an active laser medium and a crystal for generating second and higher harmonics located in said chamber;
   a power sensor device provided outside the resonator chamber in an approximate alignment with a longitudinal axis of the resonator chamber near the fully reflecting mirror, said power sensor including:
   a scatter disk for scattering light energy received from said chamber;
   a filter for absorbing frequency doubled wavelength of the laser medium and the wavelength of a pumping light; and,
   an optical sensor for receiving light energy from said scatter disk and being connected with a comparator circuit, an output of said power sensor being used to actuate a device to deactivate the laser layout.

2. Laser layout according to claim 1, wherein the optical sensor is a rapid photodiode.

3. Laser layout according to claim 2, wherein the laser layout includes a Nd:YAG laser.

4. Laser layout according to claim 3, whereby light exiting at a reverse side of the fully reflecting mirror and scattered by the scatter disk impacts the optical sensor without optical imaging means.

5. Laser layout according to claim 4, wherein the scatter disk is a coated scatter disk that is homogeneous over a large solid angle.

6. Laser layout according to claim 5, wherein a reference voltage of the comparator circuit is variable.

7. Laser layout according to claim 6, wherein the device to deactivate the laser includes a Q-switch connected through a driver stage with the comparator circuit.

8. Laser layout according to claim 7, wherein the device to deactivate the laser includes a shutter located in the resonator chamber.

9. Laser layout according to claim 8, wherein the shutter is connected with a safety system, which supplies a signal to maintain the shutter open only if all monitoring signals connected with said safety system indicate possible laser operation.

10. Laser layout according to claim 9, wherein the driver stage of the Q-switch is actuated through an AND gate, whereby a comparator outlet signal is connected with a signal for releasing a pulsating operation of the laser.

11. Laser layout according to claim 10, wherein the comparator outlet signal is connected through the D-flip-flop with the device to deactivate the laser.

12. Laser layout according to claim 11, wherein an inverting inlet of the comparator is connected with the photodiode, the outlet signal of the comparator is connected with a clock inlet of the D-flip-flop, and a Q outlet of the D-flip-flop is connected with at least one device to deactivate the laser layout.

13. Laser layout according to claim 12, wherein the Q outlet of the D-flip-flop is connected with a luminous diode.

14. Laser layout according to claim 13, wherein a reset inlet of the D-flip-flop is connected with a reset key.

15. Laser layout according to claim 1, wherein the filter is an absorption filter, whereby light exiting at a reverse side of the fully reflecting mirror and scattered by the scatter disk impacts the optical sensor without optical imaging means.

16. Laser layout according to claim 1, wherein the scatter disk is a coated scatter disk that is homogeneous over a large solid angle.

17. Laser layout according to claim 1, wherein a reference voltage of the comparator circuit is variable.

18. Laser layout according to claim 1, wherein the device to deactivate the laser includes a Q-switch connected through a driver stage with the comparator circuit.

19. Laser layout according to claim 18, wherein the device to deactivate the laser includes a shutter located in the resonator chamber.

20. Laser layout according to claim 19, wherein the shutter is connected with a safety system, which supplies a signal to maintain the shutter open only if all monitoring signals connected with said safety system indicate possible laser operation.

* * * * *